United States Patent [19]

Ligorati et al.

[11] 4,331,790

[45] May 25, 1982

[54] SUPPORTED CATALYST FOR THE POLYMERIZATION OF OLEFINS

[75] Inventors: Ferinando Ligorati, Usmate; Renzo Invernizzi; Roberto Catenacci, both of Milan, all of Italy

[73] Assignee: Euteco Impianti S.p.A., Milan, Italy

[21] Appl. No.: 95,892

[22] Filed: Nov. 19, 1979

[30] Foreign Application Priority Data

Nov. 21, 1978 [IT] Italy ............................... 29967 A/78

[51] Int. Cl.$^3$ ........................... C08F 4/02; C08F 10/00
[52] U.S. Cl. ................................ 526/119; 252/429 C; 526/125; 526/352
[58] Field of Search ................................ 526/119, 125

[56] References Cited

U.S. PATENT DOCUMENTS

| 3,654,249 | 4/1972 | Sliedrich et al. | 526/119 |
| 4,022,958 | 5/1977 | Matsuura et al. | 526/124 |
| 4,064,334 | 12/1977 | Kuroda et al. | 526/125 |
| 4,069,169 | 1/1978 | Toyoda et al. | 526/119 |
| 4,093,789 | 6/1978 | Kuroda et al. | 526/125 |
| 4,115,319 | 9/1978 | Scata et al. | 526/124 |
| 4,144,390 | 3/1979 | Slenoith et al. | 526/124 |
| 4,167,493 | 9/1979 | Hsieh | 526/119 |
| 4,218,339 | 8/1980 | Zucchini et al. | 526/125 |

FOREIGN PATENT DOCUMENTS

| 2324766 | 1/1974 | Fed. Rep. of Germany | 526/125 |
| 1286867 | 8/1972 | United Kingdom | 526/125 |
| 1292853 | 10/1972 | United Kingdom | 526/125 |
| 1305610 | 2/1973 | United Kingdom | 526/125 |
| 1314258 | 4/1973 | United Kingdom | 526/125 |

Primary Examiner—Edward J. Smith
Attorney, Agent, or Firm—Sughrue, Mion, Zinn, Macpeak and Seas

[57] ABSTRACT

A process for the homo- or co-polymerization of olefins by the low pressure method, using a catalyst comprising the combination of an organo-metallic compound of a metal of Group I, II or III of the Periodic Table of the Elements and a compound of a transition metal of Group IV, V or VI of said Periodic Table supported on a carrier. The carrier is a mixture of anhydrous $MgCl_2$ with an alkoxy- or alkoxy-chloro-titanate in a $MgCl_2$/titanate molar ratio of from 0.01 to 1:1.

4 Claims, No Drawings

SUPPORTED CATALYST FOR THE POLYMERIZATION OF OLEFINS

The present invention relates to mixed supports for catalysts particularly suitable for the polymerization and copolymerization of alpha-olefins at low pressure.

It is known that in such processes the catalytic system generally consists of a Zeigler catalyst formed by the combination of a transition metal compound with an organometallic compound.

It is also known that the transition metal compound may be fixed on a support, such as $Al_2O_3$, aluminosilicates, $SiO_2$, $MgO$, $MgCO_3$, $Mg(OH)_2$ and the like.

In such a case, the average molecular weight of the polymer produced can be easily controlled, but this method presents a noticeable drawback, since, due to the modest specific activity of the catalyst, a final washing of the polymers must generally be carried out to remove from the reaction product the nocuous residues of the catalytic system.

It is also known that the halogenation of the supports, such as $Al_2O_3$, $SiO_2$, $MgO$ and $SiO_2.Al_2O_3$, affords a noticeable increase in the activity of the catalytic system, which permits the costly final washing of the polymer to be avoided, as described for example in British Pat. Nos. 1,314,784 and 1,315,770. However, these catalysts do not permit an easy control of the average molecular weight of the polymer, and the processing of the products are often difficult, since the polymers generally have very high values of the average molecular weight and very low melt-index values.

An object of the present invention is a process for the polymerization or copolymerization of alpha-olefins, which permits the advantages of the two above types of catalysts to be combined, thus obtaining:

(a) a high catalytic activity in the polymerization, so that any washing of the polymer thus obtained can be avoided;

(b) an easy control of the average molecular weight of the polymer. The invention provides a process for the homo- or co-polymerization of olefins by the low pressure Ziegler method, using a catalyst comprising the combination of an organometallic compound of a metal of Group I, II or III of the Periodic Table of the Elements and a compound of a transition metal of Group IV, V or VI of said Periodic Table supported on a carrier, characterized in that said carrier is a mixture of anhydrous $MgCl_2$ with an alkoxy- or alkoxy-chloro-titanate in a $MgCl_2$/titanate molar ratio of from 0,01 to 1:1.

The preparation of the mixed support may be carried out according to conventional methods used for the intimate mixing of two solids. Particular care should be taken to obtain a fine subdivision of the two solids and a perfect homogeneity of the mixture.

For example, it is possible to admix solid anhydrous $MgCl_2$ with a solution of the alcoholate or chloroalcoholate of titanium in a little amount of alcohol (for example ethanol), the mixing being carried out slowly and gradually, under continuous agitation and at a temperature (for example 100° C.) such as to evaporate said alcohol.

It is also possible to add, under continuous agitation, the solid alcoholate of chloroalcoholate of titanium to a suspension of $MgCl_2$ in a dispersing liquid, preferably a hydrocarbon (for example n-heptane). It is also possible to carry out a mechanical mixing of the two solids, or to use other convenient mixing methods.

The quantity of alcoholate or chloroalcoholate of titanium to be added to $MgCl_2$ may vary within a wide range. Generally the molar ratio between (chloro)-alcoholate of titanium and $MgCl_2$ is from 1:1 to 0.01:1.

Although a large number of alcoholates and chloroalcoholates of titanium may be used with advantage as components of the mixed supports, best results are generally obtained with alcoholates chosen from tetramethoxy- and tetraethoxy-titanate, and chloroalcoholates chosen from titanium chloroethoxylates, such as diethoxydichlorotitanate and monoethoxy-trichlorotitanate.

The mixed support thus obtained is then reacted with a compound of a transition metal of group IV, V or VI of the Periodic Table of the Elements. These compounds are generally chosen from halides and oxyhalides of Ti, V and Cr. Examples of suitable compounds are $TiCl_4$, $TiBr_4$, $VCl_4$, $VOCL_3$, $VOBr_3$ and $CrO_2Cl_2$. Best results are generally obtained with $TiCl_4$.

The operating conditions used for the reaction between the mixed support and the compound of the transition metal are not particularly critical, and a number of methods may be used for carrying out said reaction.

Thus, for example, when using $TiCl_4$, the reaction may be carried out at atmospheric pressure, at a temperature of from 25° to 136° C. and for a period generally ranging from 1 to 12 hours.

For example, the dry support may be treated with $TiCl_4$ in the liquid or gaseous phase. Another efficient method consists of treating the support in suspension in a dispersing and inert medium (such as a paraffinic, naphthenic or aromatic hydrocarbon) with $TiCl_4$ in the liquid or gaseous phase.

An advantage of the process according to the present invention is that the quantity of compound of the transition metal to be reacted with the support is extremely low. Thus, for example, when using $TiCl_4$, it may be possible to use a $MgCl_2/TiCl_4$ molar ratio of from 1:0.2 down to 1:0.05. In addition to the economical advantage, another obvious advantage is the very low pollution of the polymer by the catalytic residues.

As already specified, the supported catalytic component thus obtained is then activated by treatment with an organometallic compound of a metal of group I, II or III of the Periodic Table of the Elements. These organometallic compounds may be chosen from the metal-alkyls, the halides and the hydrides of metal-alkyls, or even Grignard compounds. These metals may be chose, for example, from Al, Zn, Mg, Na and Li. Suitable compounds are thus, for example, trimethylaluminium, monochlorodiethylaluminium, isobutylaluminium hydride, $(C_2H_5)$ MgBr, ethylaluminium sesquichloride and the like.

Best results are generally obtained with the aluminium-alkyls and the halides of aluminium-alkyls, and especially with aluminium-triethyl and aluminium-tri-isobutyl. The quantity of organometallic compound to be used is not particularly critical. However, preferably, said compound should be present in molar excess with respect to the transition metal compound present in the support.

The catalytic system of the present invention may be used for the homo-and co-polymerization of alpha-olefins having from 2 to 10 carbon atoms such as ethylene, propylene, butene-1, pentene-1, hexene-1,4 and methylpentene-1. Particularly advantageous results are obtained in the case of the preparation of homo- and co-polymers of ethylene.

The homo- or co-polymerization of the olefins may be carried out according to any conventional method, either in the gaseous phase or in solution. In this last case, the solvents used are inert compounds, and preferably aliphatic or cycloaliphatic hydrocarbons. The polymerization pressure is generally from atmospheric pressure up to 50 Kg/cm2. The temperature is generally from 40° to 170° C., preferably 80°–130° C.

The regulation of the average molecular weight of the polymer which it is desired to obtain can be achieved, as well as by means of suitable choice of the support, prepared according to the invention, also by means of the addition of one or more of the conventional chain terminating agents, such as hydrogen, alcohols, $CO_2$, zinc-alkyls and cadmium-alkyls.

Several examples will be given hereinafter purely for illustrative purposes. These must not be considered as a limitation of the invention.

EXAMPLE 1

10 g. of anhydrous $MgCl_2$, ground to an average size of 25 microns, are suspended in 200 cc of anhydrous n-heptane (containing less than 5 ppm of water) in a five-neck flask immersed in a heating bath, and provided with an agitator, a thermometer, a reflux cooler and a feeding opening. The flask is flushed with anhydrous nitrogen.

620 mg of trichloromonoethoxy titanate with an average size of 25 microns are then added, while avoiding any contact with the moisture of air. The resulting mixture is agitated at ambient temperature for 6 hours. The suspension is then treated with 1 cc of pure $TiCl_4$ for 4 hours at 100° C.

After the treatment, the suspension is cooled, washed and decanted 5 times with a total quantity of 200 cc of anhydrous n-heptane, and then the decanted product is brought in suspension by dilution to exactly 200 cc. The solid thus obtained contains 2.1% by weight of Ti. 1 cc of the suspension, containing 50 mg of catalytic component, is suspended in 2000 cc of anhydrous n-heptane (containing less than 5 ppm of water) previously treated with 200 mg of aluminium-triethyl.

The suspension containing the catalytic complex thus formed is stored for one hour at ambient temperature and is then transferred, in an atmosphere of anhydrous nitrogen, into a 4 liter autoclave. The temperature is brought to 85° C. and maintained at this value for the whole duration of the polymerization. The autoclave is then brought to a pressure of 2.5 kg/cm² by introducing hydrogen, and then to a total pressure of 5 kg/cm² by introducing ethylene. The pressure is kept to this value, by means of the addition of ethylene, during the whole duration of the polymerization. After one hour of treatment, degassing and cooling are carried out and the polyethylene thus produced is filtered. There are obtained 355 g of polymer with a melt index of 0.3 and a degree of crystallinity of 70%. The output is 2840 g of polyethylene/g of catalyst/hour/atmosphere of ethylene. The specific activity is 135.2 kg of polyethylene/gram of Ti/hour/atmosphere of ethylene.

By way of comparison the preceding run is carried out in the absence of the chloroalcoholate of Ti. More particularly, 10 g of anhydrous $MgCl_2$, ground to an average size of 25 microns, are brought in suspension in 200 cc of anhydrous n-heptane, in the apparatus of Example 1. 1 cc of pure $TiCl_4$ is added and the whole is heated for 4 hours at 100° C. At the end of this treatment, the mixture is cooled and the preparation of the catalytic component is carried out as in Example 1.

The solid thus obtained contains 0.8% by weight of Ti. 1 cc of this suspension, containing 50 mg of catalytic component, is then treated as in Example 1 to form the catalytic complex, and is then reacted with ethylene by operating as in Example 1.

9.0 g of polyethylene are obtained, which corresponds to an output of 72 g of polyethylene/g of catalyst/hour/atmosphere of ethylene. The specific activity of the catalyst is 9.0 kg of polyethylene/g of Ti/hour/atmosphere of ethylene.

EXAMPLE 2

50 g of anhydrous magnesium chloride, ground to an average size of 25 microns, are introduced into a flask immersed in a heating bath, and provided with an agitator, a thermometer, and a feeding opening. The flask is flushed with anhydrous nitrogen.

The $MgCl_2$ powder is heated at 100° C. and kept under continuous agitation, 4.15 g of $(C_2H_5O)TiCl_3$ in 20 cc of anhydrous $C_2H_5OH$ are added dropwise in a period of 2 hours (still at 100° C.), taking care that the formation of lumps be avoided and that the $MgCl_2$ powder be always in the dry state. The magnesium chloride thus impregnated is treated with 5 cc of $TiCl_4$ dissolved in 20 cc of anhydrous n-heptane, using the same impregnation technique. There is obtained a dry catalytic component which contains 2.5% by weight of Ti.

The polymerization is carried out by using 30 mg of catalytic component admixed with 2000 cc of anhydrous n-heptain containing 150 mg of aluminium-triethyl, using the same operating conditions as in Example 1.

304 g of polyethylene are obtained. The output is 4048 g of polyethylene/g of catalyst/hour/atmosphere of ethylene. The specific activity is 162 kg of polyethylene/g of Ti/hour/atmosphere of ethylene.

EXAMPLE 3

10 grams of anhydrous magnesium chloride, ground to an average size of 25 microns, and 0.5 grams of diethoxy-dichlorotitanate are introduced into a glass tube provided with a porous septum at its lower end, and with a heating jacket.

The lower end of the glass tube is connected to a Drechsel bottle, located in a bath maintained at 60° C., and containing $TiCl_4$ through which a flow of anhydrous nitrogen (containing less than 5 ppm of water) is circulated at a rate of 25 cc/hour. The mixture of $MgCl_2$ and $(C_2H_5O)_2 TiCl_2$ is brought to a temperature of 100° C. and is then fluidized by means of the flow of nitrogen and $TiCl_4$. The treatment is carried out for three hours.

The catalytic component thus obtained contains 3.1% by weight of Ti. 50 mg of this catalytic component are used for the polymerization of ethylene, by operating under the same conditions as in Example 1. 425 grams of polyethylene are obtained.

The output is 3400 grams of polyethylene/gram of catalyst/hour/atmosphere of ethylene. The specific activity is 109.6 kg of polyethylene/gram of Ti/hour/atmosphere of ethylene.

EXAMPLE 4

10 grams of the $MgCl_2$ used in Example 1 are treated, by using the same operative conditions as in Example 1, with 500 mg of tetramethoxy titanate and then with 8 cc of pure $TiCl_4$ for 12 hours and at ambient temperature.

The suspension is washed (and then decanted) five times, using 80 cc of anhydrous n-heptane each time, and the decanted product is then dried in a stream of dry nitrogen at 100° C. The solid catalytic component thus obtained contains 1.7 wt.% of Ti.

50 mg of this catalytic component are used for the polymerization of ethylene, by using the operative conditions as in Example 1. 280 g of polyethylene are obtained. The output is 2240 g of polyethylene/gram of catalyst/hour/atmosphere of ethylene. The specific activity is 131.8 kg of polyethylene/gram of Ti/hour/atmosphere of ethylene.

We claim:

1. In a process for the homo- or copolymerization of olefins by the low pressure Zigeler method, using a catalyst consisting of the combination of an organo-metallic compound of a metal of Group I, II or III of the Periodic Table of the Elements and titanium tetrachloride supported on a carrier, the improvement comprising using a carrier consisting of a mixture of anhydrous $MgCl_2$ with an alkoxy- or alkoxychlorotitanate in a $MgCl_2$/titanate molar ratio of from 0.01 to 1:1, wherein the organo-metallic compound is used in a molar excess with respect to the titanium tetrachloride and is selected from the group consisting of alkyl-aluminum compounds which are in turn selected from the group consisting of aluminum-triethyl and aluminum-tri-isobutyl and alkyl-aluminum halides and wherein said titanate is selected from the group consisting of tetramethoxytitanate, tetraethoxytitanate and ethoxy-chlorotitanates.

2. The process of claim 1, wherein said titanate is selected from the group consisting of tetramethoxytitanate, tetraethoxytitanate, monoethoxy-trichlorotitanate and diethoxydichlorotitanate.

3. The process of claim 1, wherein the molar ratio between $MgCl_2$ and $TiCl_4$ is from 1:0.2 to 1:0.05.

4. The process of claim 1 wherein said olefin is ethylene.

* * * * *